(12) United States Patent
Urban et al.

(10) Patent No.: US 12,198,238 B2
(45) Date of Patent: Jan. 14, 2025

(54) METHOD AND ARRANGEMENT FOR PRODUCING A SURROUNDINGS MAP OF A VEHICLE, TEXTURED WITH IMAGE INFORMATION, AND VEHICLE COMPRISING SUCH AN ARRANGEMENT

(71) Applicants: VOLKSWAGEN AG, Wolfsburg (DE); AUDI AG, Ingolstadt (DE)

(72) Inventors: Alexander Urban, Gifhorn (DE); Georg Maier, Hepburg (DE); Sascha Ziebart, Braunschweig (DE); Frank Schwitters, Königslutter (DE); Gordon Seitz, Ehra (DE)

(73) Assignee: Volkswagen Aktiengesellschaft (DE)

( * ) Notice: Subject to any disclaimer, the term of this patent is extended or adjusted under 35 U.S.C. 154(b) by 430 days.

(21) Appl. No.: 17/272,536

(22) PCT Filed: Aug. 12, 2019

(86) PCT No.: PCT/EP2019/071631
§ 371 (c)(1),
(2) Date: Mar. 1, 2021

(87) PCT Pub. No.: WO2020/043475
PCT Pub. Date: Mar. 5, 2020

(65) Prior Publication Data
US 2021/0327113 A1 Oct. 21, 2021

(30) Foreign Application Priority Data
Aug. 31, 2018 (DE) ..................... 10 2018 214 874.0

(51) Int. Cl.
*G06T 11/60* (2006.01)
*B60R 1/00* (2022.01)
(Continued)

(52) U.S. Cl.
CPC ................ *G06T 11/60* (2013.01); *B60R 1/00* (2013.01); *G06T 3/40* (2013.01);
(Continued)

(58) Field of Classification Search
CPC .. G06T 11/60; G06T 3/40; B60R 1/00; B60R 2300/303; B60R 2300/607; B60R 2300/806; H04N 7/18
See application file for complete search history.

(56) References Cited

U.S. PATENT DOCUMENTS

| 6,919,822 B2 | 7/2005 | Tanaka et al. |
| 7,317,813 B2 | 1/2008 | Yanagawa et al. |

(Continued)

FOREIGN PATENT DOCUMENTS

| AU | 2015100235 A4 | 4/2015 |
| DE | 102005023461 A1 | 12/2005 |

(Continued)

OTHER PUBLICATIONS

"Speed", Nov. 2015, Wikipedia, pp. 1-2 (Year: 2005).*
Search Report for International Patent Application No. PCT/EP2019/071631; Sep. 16, 2019.

*Primary Examiner* — Terrell M Robinson
(74) *Attorney, Agent, or Firm* — BARNES & THORNBURG LLP

(57) ABSTRACT

A method for producing a surroundings map of a transportation vehicle textured with image information, including detecting at least first and second image information from vehicle surroundings using at least one transportation vehicle-mounted camera device; producing a surroundings map of the transportation vehicle; determining at least one area of the surroundings map in which both the first and second sets of image information are present; and selecting either the first or the second set of image information for texturing the area of the surroundings map according to at (Continued)

least one of the following criteria: selecting the image information with the highest resolution and selecting the latest image information. Also disclosed is an arrangement for producing a surroundings map of a transportation vehicle textured with image information and a transportation vehicle having the arrangement.

11 Claims, 1 Drawing Sheet

(51) Int. Cl.
    *G06T 3/40*         (2006.01)
    *H04N 7/18*         (2006.01)

(52) U.S. Cl.
    CPC ... *B60R 2300/303* (2013.01); *B60R 2300/607* (2013.01); *B60R 2300/806* (2013.01); *H04N 7/18* (2013.01)

(56) References Cited

U.S. PATENT DOCUMENTS

| | | | |
|---|---|---|---|
| 7,500,756 B2 | 3/2009 | Ito | |
| 8,009,869 B2 | 8/2011 | Kumon | |
| 9,544,549 B2 | 1/2017 | Vovkushevsky et al. | |
| 2007/0003162 A1* | 1/2007 | Miyoshi | G08G 1/167 |
| | | | 382/276 |
| 2007/0124071 A1* | 5/2007 | Joo | G01C 21/365 |
| | | | 701/431 |
| 2010/0283633 A1* | 11/2010 | Becker | B60R 1/00 |
| | | | 340/932.2 |
| 2012/0170812 A1* | 7/2012 | Kamiyama | H04N 7/181 |
| | | | 382/103 |
| 2012/0249794 A1* | 10/2012 | Kiyo | B60R 1/00 |
| | | | 348/148 |
| 2013/0229524 A1* | 9/2013 | Vovkushevsky | H04N 7/183 |
| | | | 348/148 |
| 2015/0077562 A1* | 3/2015 | Heckel | B60R 1/00 |
| | | | 348/148 |
| 2016/0049078 A1 | 2/2016 | Neff et al. | |
| 2018/0005384 A1* | 1/2018 | Ding | G06T 7/246 |

FOREIGN PATENT DOCUMENTS

| | | | | |
|---|---|---|---|---|
| DE | 102007017038 A1 | 10/2007 | | |
| DE | 60318339 T2 | 12/2008 | | |
| DE | 10292327 B4 | 6/2009 | | |
| DE | 102010051206 A1 | 5/2012 | | |
| DE | 102013214369 A1 * | 1/2015 | ............... | B60R 1/00 |
| DE | 102013019374 A1 | 5/2015 | | |
| DE | 102015203261 A1 | 9/2015 | | |
| DE | 102014223941 A1 | 5/2016 | | |
| DE | 102015002438 A1 | 9/2016 | | |
| DE | 102016013696 A1 | 5/2017 | | |
| WO | 2017108221 A1 | 6/2017 | | |

\* cited by examiner

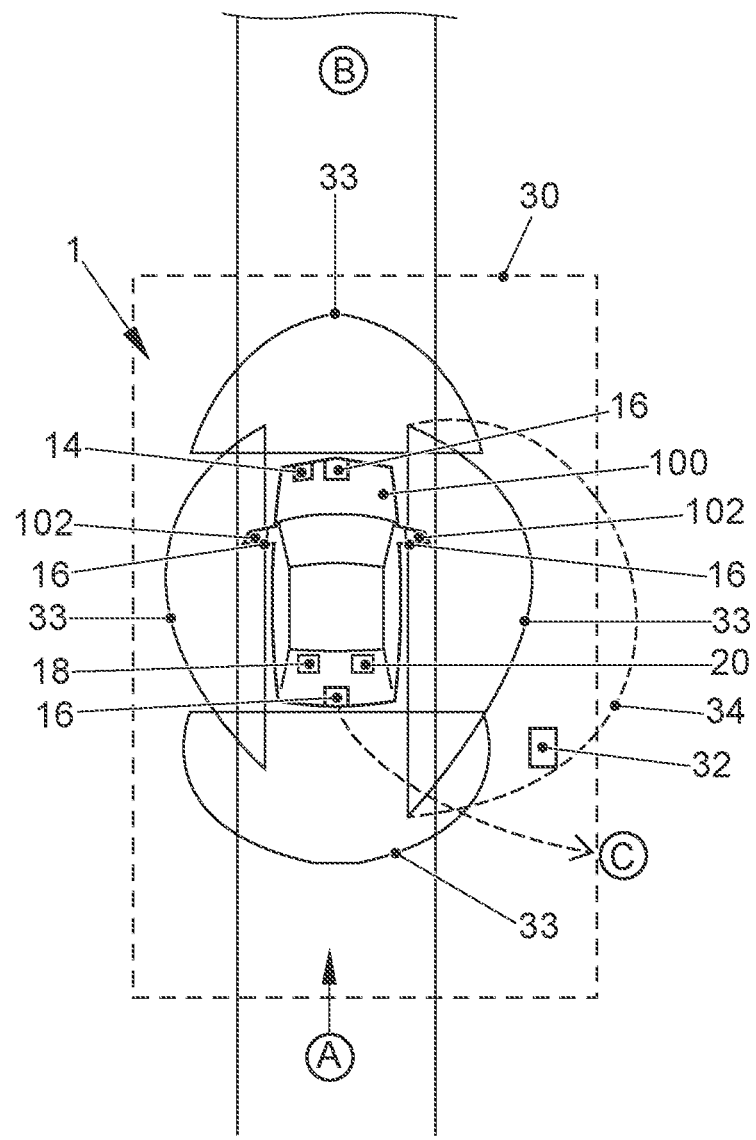

METHOD AND ARRANGEMENT FOR PRODUCING A SURROUNDINGS MAP OF A VEHICLE, TEXTURED WITH IMAGE INFORMATION, AND VEHICLE COMPRISING SUCH AN ARRANGEMENT

PRIORITY CLAIM

This patent application is a U.S. National Phase of International Patent Application No. PCT/EP2019/071631, filed 12 Aug. 2019, which claims priority to German Patent Application No. 10 2018 214 874.0, filed 31 Aug. 2018, the disclosures of which are incorporated herein by reference in their entireties.

SUMMARY

Illustrative embodiments relate to a method and an arrangement for producing a surroundings map of a transportation vehicle textured with image information, in particular, in connection with parking operations, and to a transportation vehicle comprising such an arrangement.

BRIEF DESCRIPTION OF THE DRAWINGS

An exemplary embodiment is explained below on the basis of the accompanying schematic figures. In the figures:

FIG. 1 shows a schematic illustration of a transportation vehicle comprising an arrangement, wherein the arrangement performs the disclosed method.

DETAILED DESCRIPTION

The use of image information to produce representations of the surroundings in transportation vehicles is known. Representations of the surroundings are generally used to inform a driver of a current operating situation of the transportation vehicle and, in particular, to provide the driver with a representation of the current transportation vehicle surroundings. This can be carried out, for example, using a display device in the transportation vehicle interior, on which the representation of the surroundings is displayed.

There are approaches in the prior art for creating representations of the surroundings using transportation vehicle-mounted cameras. In this case, the representation of the surroundings can be created and displayed as a so-called top-view or bird's-eye view perspective in which a model-like representation of the transportation vehicle itself is often displayed for orientation purposes (for example, in the center of the image). In other words, representations of the surroundings are known, in which a model of the transportation vehicle in plan view and the transportation vehicle surroundings are presented, wherein the transportation vehicle surroundings are imaged on the basis of the captured camera images. Such a solution is offered by the applicant under the name "Area View".

The representation of the surroundings is typically assembled from images captured by a plurality of transportation vehicle-mounted camera devices. For this purpose, approaches are known in which a (virtual) projection screen is produced and the images are projected into this projection screen, wherein the images from a plurality of cameras are combined to form the representation of the surroundings during accordingly simultaneous projection. In this case, projection is effected, for example, in accordance with the known installation positions and/or viewing angles of the camera devices.

In this context, DE 10 2010 051 206 A1 discloses the practice of joining a plurality of partial images to form a larger region which exceeds the partial images, wherein additional symbols (so-called artificial pixels) can also be displayed. Further technological background exists in DE 10 2015 002 438 A1, DE 10 2013 019 374 A1, DE 10 2016 013 696 A1 and DE 603 18 339 T2.

It is also known practice to create so-called surroundings maps for a transportation vehicle, in which information relating to the transportation vehicle surroundings is stored, in particular, in a location-based manner (that is to say the information relates to specific locations within the surroundings map). The information can be captured by sensor devices of the transportation vehicle, for example, so-called surroundings sensors. The sensor devices may be generally configured to capture the surroundings optically, acoustically, by ultrasound and/or by radar. Examples of such sensor devices are (optical) distance measurement devices, radar sensors, Lidar sensors or ultrasonic sensors. The surroundings map can be stored as a file and/or a collection of digital information, for example, in a control device of the transportation vehicle, and can be continuously updated. Such a surroundings map could also be used, in principle, to display a representation of the surroundings to the driver of a transportation vehicle.

However, it has been shown that a desired quality (that is to say closeness to reality) of the representation of the surroundings cannot always be achieved with the known approaches.

Disclosed embodiments improve the quality of a representation of the surroundings for a transportation vehicle.

This is achieved with a method, an arrangement and a transportation vehicle. It goes without saying that the options and features discussed in the introductory part may also be provided alone or in any desired combination in the present disclosure, unless otherwise stated or clear.

Disclosed embodiments create a surroundings map, for example, by the sensor devices explained above, and texturing this map with image information captured by at least one camera device, wherein the textured surroundings map can be used as a representation of the surroundings and can be displayed to a driver. In particular, if the surroundings map contains and/or represents information relating to a three-dimensional form of the surroundings and/or an elevation profile of the surroundings, this map can be used to produce a realistic representation of the surroundings.

Furthermore, disclosed embodiments involve selecting image information suitable for texturing the surroundings map as necessary or according to the situation. For example, it has been recognized that, during a journey (that is to say a transportation vehicle movement in any desired directions at a speed which differs from 0 km/h and optionally with the production of a traction force) and, in particular, during parking maneuvers, surrounding regions can be positioned differently within capture regions of camera devices of the transportation vehicle and can be moved within the capture regions. Since the capture regions of a camera device can generally be divided into high-resolution and low-resolution regions in which image information of an accordingly higher or lower quality can be produced, both high-quality and lower-quality image information may therefore be available for the same surrounding region during a journey. Disclosed embodiments propose the practice of taking into account different quality levels of image information, which relates to the same surrounding region, when texturing the surroundings map and, in particular, giving preference to high-quality image information for the texturing.

However, it has likewise been recognized that the use of up-to-date image information may be desired in certain operating situations. This may be the case, for example, when changes in the surroundings are detected and the representation of the surroundings must therefore be updated for a realistic representation of the surroundings.

Furthermore, the disclosed embodiments may provide for both of the above-mentioned selection criteria to be taken into account, but for preference to be given to one of them as standard. For example, high-quality image information may be desired and selected for texturing as standard, unless more up-to-date image information is available for the corresponding region to be textured.

In detail, a method for producing a surroundings map of a transportation vehicle, textured with image information is proposed, comprising: capturing at least first and second image information from transportation vehicle surroundings using at least one transportation vehicle-mounted camera device; producing a (virtual) surroundings map of the transportation vehicle (for example, on the basis of information captured by (surroundings) sensor devices explained below); determining at least one region of the surroundings map, for which both the first and the second image information is available; and selecting either the first or the second image information for texturing this region of the surroundings map according to at least one of the following criteria:
that image information with the higher resolution is selected;
the more up-to-date image information is selected.

The textured surroundings map may generally be a representation of the surroundings or may be used as such. In particular, it may be a representation of the surroundings produced in as or on the basis of image and/or video files. This representation of the surroundings can be displayed on a display device, in particular, in a transportation vehicle interior.

As described above, the surroundings map may represent properties of the surroundings, in particular, their structure and/or form. According to at least one disclosed embodiment, the surroundings map comprises an elevation profile of the surroundings, in which case a complete three-dimensional profile of the transportation vehicle surroundings may be involved. However, an extent of structures of the transportation vehicle surroundings in the vertical spatial direction should at least be captured and stored and/or represented in the surroundings map, wherein the vertical spatial direction may run orthogonal to the transportation vehicle underlying surface. It goes without saying that the dimensions of the elevation profile which can be captured (or else of the complete three-dimensional profile of the transportation vehicle surroundings) can be restricted, for example, by the sensor devices used and their capture regions.

Generally, the surroundings map may be a file and/or may be a collection of digital information which, for example, represents the surroundings as a collection of (measurement) points and/or a lattice model. Texturing can be understood as meaning the mapping of the image information to the surroundings map (for example, by virtual or computer-aided projection) and/or the filling of regions or surfaces of the surroundings map with the image information. The surroundings map can therefore function in the sense of a projection screen explained in the introductory part.

The captured image information may be video information and/or a video image data stream. Accordingly, the texturing of the surroundings map can be continuously updated and/or produced, for example, by continuously supplying new (that is to say currently captured) image information. If image information captured using different camera devices is used, image information captured or recorded at identical capture times may be used to produce the texturing.

The image information may be captured using at least one transportation vehicle-mounted camera device. According to at least one disclosed embodiment, at least three or at least four camera devices may be provided and may be distributed around the transportation vehicle, for example, with the result that cameras may be provided on every side of the transportation vehicle (that is to say on the front and rear sides and on the two outer sides comprising the entrance doors). Consequently, the surroundings map can be displayed to a driver as a so-called "surround" or 360° view. As mentioned, the image information may be provided as video data and/or an image data stream, and the camera devices may be accordingly as video cameras.

The surroundings map may be at least partially produced on the basis of information captured using at least one transportation vehicle-mounted sensor device, wherein the transportation vehicle-mounted sensor device may be a sensor device which differs from the camera devices. In particular, the sensor device may be configured not to capture the transportation vehicle surroundings on the basis of measured surrounding light intensities, as is conventional in camera devices. For example, the sensor device may be one of the following: a distance measurement device, a radar device, a Lidar device, an ultrasonic device, an optical distance measurement device (for example, based on laser radiation).

The surroundings map may generally be produced during a journey and may cover, for example, a driving distance of at least 5 m, at least 10 m, at least 15 m or at least 20 m (that is to say the surroundings map may extend along such a driving distance). In a ring memory or else the so-called FIFO principle (First In First Out), regions of the surroundings map which may be counter to the current direction of travel or are behind the transportation vehicle based on the current direction of travel, can then be deleted and new regions of the surroundings map, which may be in the direction of travel, can be added. This can be carried out by accordingly deleting and adding information for these regions.

Furthermore, a position of the transportation vehicle within the surroundings map can generally also be determined. For this purpose, it is possible to resort, in a manner known per se, to odometry information which captures or represents wheel movements, for example. A steering angle and/or a transportation vehicle inclination can also be captured and taken into account. It is likewise possible to resort to information from navigation systems (in particular, positioning information), in which case such information can be produced, for example, on the basis of GPS signals. However, an exemplary embodiment without the aid of such information and, in particular, GPS signals to be independent of current reception conditions for such signals.

This can also be used to the effect that corresponding location information can likewise be assigned to the image information captured by a camera device. In this case, it is beneficial if the camera device is and remains similarly positioned inside the transportation vehicle (that is to say is positioned at a constant location therein and/or is oriented in an invariable manner and therefore has a constant viewing angle). On the basis of this, a transportation vehicle position can be converted into a position of the camera devices and/or corresponding location information can be assigned to the captured image information, for example.

In a similar manner, corresponding location information can also be assigned to regions of the surroundings map, wherein it is possible to resort to a position of the sensor device to produce the surroundings map (for example, distance sensors) and to convert a determined transportation vehicle position into a position of the sensor device, for example. Information captured thereby can then likewise be provided with location information.

Both regions of the surroundings map and captured image information can therefore generally be provided with location information, with the result that it is also possible to determine which image information relates to which regions of the surroundings map.

The solution presented herein can generally relate to parking operations or can be used for that purpose. Consequently, the solution can be selectively activated or carried out when a driver activates, for example, a parking space searching operation or other assistance functions in connection with parking operations or generally makes inputs which indicate a parking request. At the latest in this case, the surroundings map can also be produced and/or textured as described herein. In particular, at the latest in this case, a transportation vehicle can be located within the surroundings map.

If a plurality of camera devices are provided, provision may be made for image information captured overall by these camera devices to be taken into account and optionally stored and for a selection to then be made therefrom with respect to the texturing of the surroundings map according to various criteria. In this case, it may therefore be considered to be insignificant which camera devices provide which image information, but rather solely the capture time of the image information (up-to-dateness criterion) or the resolution of the image information (resolution criterion) can be taken into account.

As described in the introductory part, both criteria mentioned may also be taken into account, but in hierarchical form. In other words, priority can be given to one criterion provided that certain operating situations do not occur and/or other conditions are met and image information is then selected according to the corresponding other criterion. For example, the resolution criterion can be considered as standard, unless an operating situation is detected in which the consideration of more up-to-date image information is desired. This may relate, for example, to an object (for example, a pedestrian or a transportation vehicle) entering a capture region of the at least one camera device of the transportation vehicle, which can be detected using image evaluation algorithms which are known per se.

More precisely, one development provides for the more up-to-date image information to be used (at the latest) when a change in the transportation vehicle surroundings and/or a predetermined object in the transportation vehicle surroundings is/are detected within the region.

Additionally or alternatively, the more up-to-date image information can be used (at the latest) when the transportation vehicle undershoots a predefined distance threshold value with respect to the at least one region of the surroundings map. In particular, the distance threshold value can be considered in the direction of travel in this case. This option is based on the concept that transportation vehicle-mounted camera devices generally have a high-resolution capture region close to the transportation vehicle and can capture only low-resolution image information with increasing distance from the transportation vehicle. If a distance threshold value is therefore undershot, it can be assumed, with a high degree of probability and, for example, by appropriate choice of the distance threshold value, that the corresponding region has entered the high-resolution capture region. It can therefore be automatically ensured, as it were, that image information having a higher resolution than image information already used for the texturing is used, for example, without the need for an explicit comparison of the resolutions of the image information.

If the distance threshold value may be considered in the direction of travel, it can also be ensured that only those regions of the surroundings map which were previously arranged remotely from the transportation vehicle and were therefore probably captured only with a low resolution are overwritten with new image information. In particular, provision may be made for the distance threshold value or general distance dependencies to be considered only in the direction of travel and, in particular, not counter to the direction of travel. This is because, in the latter case, the opposite situation can occur, in which regions which are initially positioned close to the transportation vehicle and are therefore captured with a high resolution are arranged at an increasing distance from the transportation vehicle. It is consequently possible to prevent the situation in which the surroundings map is overwritten with subsequently captured low-resolution image information since the corresponding regions are then presumably at a greater distance from the transportation vehicle and are also in a low-resolution capture region of the camera devices.

No further selection with respect to image information to be used may be made in regions of the surroundings map which have been textured with image information having a resolution above a threshold value, or a further selection is made only when a change in the transportation vehicle surroundings is detected within the region. The threshold value may be, for example, a comparatively high resolution and may be, in particular, a maximum resolution or at least 50%, at least 75% or at least 90% of a maximum resolution. This option can help to reduce the computing complexity since it is not necessary to search for possibly higher-resolution image information for all regions, but rather the one-time capture of image information with a desired minimum quality can be considered to be sufficient. If, however, changes in the transportation vehicle surroundings are detected within this region, more up-to-date image information and, in particular, currently available image information can also be used instead. In this case, lower resolutions may also be accepted or the resolution may not be checked since the focus is on the up-to-dateness of the texturing instead.

In one development, the surroundings map is textured, at least in regions, with the first and second image information, and regions are then determined in which:
the respective other image information has a higher resolution; and/or
the respective other image information is more up-to-date.

This makes it possible to ensure that a surroundings map which is textured to the greatest possible extent or a fully textured surroundings map is initially available to the driver and can then be locally updated or overwritten as required.

According to a further disclosed embodiment, a plurality of camera devices may be present and the first and second image information may be captured by different camera devices. In this context, the respective capture regions of the camera devices may be less than 50% congruent or may spatially overlap by less than 50%. In particular, the camera devices may be positioned on different and, in particular, opposite sides of a transportation vehicle. However, the disclosure makes it possible, for example, when the same surrounding region is captured by different camera devices on account of maneuvers during a parking operation, for the image information available for this purpose to be able to be considered in combination or to result from the information available overall according to the above criteria.

Furthermore, provision may be made for the surroundings map to be larger than a section of the (textured) surroundings map which can be displayed on a display device. In other words, the surroundings map, stored as a digital model and/or an image, can therefore be continuously updated, but only sections of the map can be displayed on the display device. This has the benefit that the surroundings map can already be evaluated even in regions remote from the displayed section or its information can be used differently.

Disclosed embodiments also relate to an arrangement for producing a surroundings map of a transportation vehicle, textured with image information, comprising:

a capture device for capturing at least first and second image information from transportation vehicle surroundings; and
a surroundings map production device which is configured to produce a surroundings map of the transportation vehicle (for example, on the basis of information captured by the above-mentioned sensor device) and to select either the first or the second image information for at least one region of the surroundings map, for which both first and second image information is available, for texturing the surroundings map according to at least one of the following criteria:
that image information with the higher resolution is selected;
the more up-to-date image information is selected.

All of the features and developments explained above and below in connection with the method can likewise be provided in the arrangement. In particular, the arrangement may be configured to carry out a method according to any of the options above and below.

The disclosed embodiments also relate to a transportation vehicle comprising an arrangement of the above type.

Finally, it should be pointed out that the production of a surroundings map can also be understood as meaning updating of an already existing surroundings map (that is to say virtually production of an up-to-date surroundings map), unless otherwise stated or clear.

FIG. 1 schematically indicates a transportation vehicle 100 which comprises an arrangement 1. A front side or front of the transportation vehicle 100 points in the direction of a region B and a rear side points in the direction of the region A. Side mirrors 102 are schematically indicated on those sides of the transportation vehicle 100 which comprise the entrance doors.

The transportation vehicle 100 comprises (surroundings) sensor devices 14 on all sides, wherein a corresponding sensor device 14 is illustrated only for the front side in FIG. 1. The transportation vehicle 100 also comprises camera devices 16 on all sides, in particular, even in both side mirrors 102. The transportation vehicle surroundings can therefore be fully captured both visually and by the sensor devices 14 in the sense of 360° capture. The camera devices 16 and sensor devices 14 are also arranged in such a manner that the capture regions overlap only partially and, in particular, are less than 50% and, in particular, less than 20% spatially congruent.

The sensor devices 14 are configured to capture information on the surroundings for creating a surroundings map. In the situation shown, the sensor devices are ultrasonic sensors, but any other sensors of the type mentioned in the introductory part and also combinations thereof can also be used inside a transportation vehicle 100. The surroundings map is continuously updated as a file containing digital information and is stored in a storage device 18 of the transportation vehicle 100. In the situation shown, the surroundings map describes a three-dimensional structure of the transportation vehicle surroundings.

The camera devices 16 are each a video camera and continuously capture the transportation vehicle surroundings. A video or image data stream from each camera device 16 is transmitted to a surroundings map production device 20, as is the information captured by the sensor devices 14. In addition to producing the surroundings map, the surroundings map production device 20 may also provide further functions explained above and below and may comprise corresponding program instructions and/or links to units of the transportation vehicle for this purpose, for example.

FIG. 1 shows the transportation vehicle in a state in which it moves from a region A to a region B. The two regions are approximately 15 m from one another. During this journey, the surroundings map would be continuously updated and image information is continuously captured.

In particular, it is assumed in the present case that the region A is selected as a starting point for producing the surroundings map, for example, since the transportation vehicle is switched on or activated there (for example, by ignition or any other electrical activation) and/or since a parking request of the driver is detected in this region or a user input is signalled, whereupon the production of a surroundings map according to the present option is activated.

In the region A, a transportation vehicle position is set to zero and the surroundings map produced for the parking operation is also created for the first time or is newly created. A movement of the transportation vehicle 100 is then captured, for example, on the basis of odometry information, and a distance and optionally also an orientation relative to the region A, which is used as a type of zero point, are determined, for example. Location information relating to the transportation vehicle 100 is therefore also available for each time.

Accordingly, captured image information and/or surroundings information from the sensor devices and therefore regions of the surroundings map which are created on the basis of the information can also be provided with location information. All of this information can be stored in the storage device 18 which may also be part of the surroundings map production device 20.

As a result, the surroundings map production device 20 can therefore resort to image information and regions of a surroundings map which can be assigned to one another on the basis of the location information or, in other words, between which correspondences can be determined on the basis of the location information. Figuratively speaking, it is therefore possible to determine which image information reliably relates to or represents which regions of the surroundings map.

Since the camera devices 16 continuously produce image information, image information relating to different times is therefore also available for each camera device 16. If the vehicle 100 is moving, this image information represents different regions of the surroundings and therefore of the surroundings map, as expected. As explained below, however, situations may also occur in which the image information represents at least partially corresponding regions of the surroundings and surroundings map, with the result that it is possible to choose between them for texturing the surroundings map.

As generally explained above, texturing can be understood as meaning mapping or projection of the image information onto the surroundings map. In this case, the image information can be only partially used (that is to say only sections of an individual image) and image information from all camera devices 14 can generally also be combined with one another. All image information may relate in this case to a corresponding capture time.

The surroundings map may be completely textured, but only a schematically indicated section 30 of the textured surroundings map can be displayed on a display device in the transportation vehicle interior. This section 30 moves in a similar manner to the transportation vehicle movement within the surroundings map and may always contains the transportation vehicle 100 in the center. At least this displayed section 30 may be textured as described herein. In a manner known per se, the section 30 may be displayed as a so-called bird's-eye view perspective or a transportation vehicle plan view, in which the transportation vehicle is displayed as a symbol. Examples of comparable representations are found in the regions 29a and 29d from FIGS. 4 & 5 of the above-mentioned DE 10 2015 002 438 A1.

In FIG. 1, a high-resolution capture region is marked with a solid line for each of the camera devices 16. The camera devices 16 are each wide-angle camera devices, the viewing angle of which also makes it possible to at least partially capture the transportation vehicle underlying surface (that is to say aimed at the transportation vehicle underlying surface). Each camera device 16 additionally has a low-resolution capture region which is at least partially indicated using a dashed line for the left-hand camera devices 16 in FIG. 1. It is seen that not all regions within the section 30 can be captured with a high resolution and high-resolution image information is therefore not available for every region of the surroundings map (at least during a journey for the first time from the region A to the region C).

To nevertheless increase the significance of the surroundings map or a representation of the surroundings which is produced and displayed on the basis thereof, possibilities which are explained below and can each be implemented alone or in any desired combination are provided.

During a journey from A to B, the region B is also already captured at the starting point A by the camera devices 16 on the front side of the transportation vehicle 100, but only with a very low resolution. Therefore, only low-resolution image information is initially available for the region B. The surroundings map in the region B can therefore be textured only on the basis of accordingly low-resolution image information.

However, when the transportation vehicle 100 is in the vicinity of the region B and, in particular, in such a manner that the region is within the high-resolution capture region of the camera devices 16, high-resolution image information is available for the region B. This high-resolution image information can be used to texture the surroundings map instead of the low-resolution image information. In particular, the surroundings map or its texturing can be locally overwritten (that is to say overwritten in the region B) as soon as high-resolution image information is available for this region B.

It is possible to determine that this is the case, for example, by comparing the resolutions of the image information which is available overall and can be assigned to the region B (as can be detected, for example, on the basis of the location information thereof). However, it can be determined that the region B is positioned at a distance from the transportation vehicle 100 which is below a distance threshold value. In this case, the distance threshold value is selected in such a manner that it corresponds to an outer boundary of the high-resolution capture region of the front camera devices 16. If this is the case, currently captured image information can be automatically used, optionally without more detailed determinations or comparisons of different resolutions, to texture the surroundings map, and it can then be assumed that this information is captured with a high resolution.

On the other hand, the situation occurs in which the region A, if the transportation vehicle is moving away from the latter, initially enters the high-resolution capture region of the rear camera devices 16 and, as the journey continues in the direction of the region B, moves out of the latter and can therefore be captured only with a low resolution. Accordingly, provision may also be made for distance considerations or the above-mentioned distance threshold value to be considered only in the direction of travel, but a reverse direction of travel may also be involved.

In addition, when high-resolution image information (and, in particular, image information with a resolution above a predetermined threshold value) is available for a region of the surroundings map, provision may be made for this image information to be used for texturing and to not be overwritten with image information captured at another time. If high-resolution image information is therefore available once for a region, the determination of possibly even higher-resolution image information can be prevented.

An exception may exist when a change in the transportation vehicle surroundings is detected, which can be effected both on the basis of the captured image information and on the basis of the (surroundings) information captured by the sensor devices 14. In both cases, detection can be carried out, for example, by virtue of a change in the respectively determined information relating to the object movement. If this is the case, irrespective of preferred high resolutions, up-to-date image information for the corresponding region can be selected for texturing the surroundings map to be able to display a representation of the surroundings which is as realistic as possible to the driver. The detection and representation of moving objects is also relevant to safety and increases driving safety if the driver is guided by the representation of the surroundings, for example, during parking operations.

As described, it is also possible to consider only one of the criteria, that is to say whether there is higher-resolution image information for the same region that is currently used to texture the surroundings map or more up-to-date information than the image information currently used for the texturing.

Yet another example of the selection of image information for texturing the surroundings map is described below on the basis of FIG. 1. FIG. 1 also shows a region C. This region corresponds to a region to which the driver can move the transportation vehicle 100 starting from the illustrated position, for example, as part of a reverse parking operation into a horizontally running parking space which is not separately illustrated in FIG. 1.

A static object, for example, a pillar 32, is also illustrated. This pillar is initially in a low-resolution capture region of the left-hand camera devices 16 in FIG. 1 and is also positioned in such a manner that high-resolution image information has not yet been captured for it during the journey starting from the region A. The surroundings map is therefore initially textured on the basis of low-resolution image information in the region containing the pillar 32.

If the transportation vehicle 100 were now to reverse into the region C according to the dashed arrow, the pillar 32 would enter the high-resolution capture region of the left-hand camera devices 16. The surroundings map production device 20 would detect this either by comparing the image information available overall for this region or by the above-described undershooting of a distance threshold value relative to the region containing the pillar 32. Therefore, current texturing of the surroundings map in the region containing the pillar 32 can be locally overwritten with high-resolution image information. This assists the driver with the parking operation if the driver would like to be guided by the representation of the surroundings displayed to him.

LIST OF REFERENCE SIGNS

1 Arrangement
14 Camera device
16 Curb
18 Storage device
20 Surroundings map production device
30 Section
32 Pillar
100 Transportation vehicle
102 Side mirror
A, B, C Regions

The invention claimed is:

1. A method for producing a surroundings map of a transportation vehicle textured with image information, the method comprising:
  capturing at least first and second image information from vehicle surroundings using at least one transportation vehicle-mounted camera device;
  producing a surroundings map of the transportation vehicle;
  determining at least one region of the surroundings map for which both the first and the second image information is available; and
  selecting either the first or the second image information for texturing is the region of the surroundings map according to at least one of the following criteria:
  selecting the image information with higher resolution; and
  selecting more up-to-date image information, wherein the more up-to-date image information is used in response to detection that the transportation vehicle has travelled within a distance range relative to an object shown within the region of the surroundings map that is less than a predefined distance threshold value.

2. The method of claim 1, wherein the more up-to-date image information is used in response to a change in the vehicle surroundings and/or a predetermined object in the vehicle surroundings being detected within the region.

3. The method of claim 1, wherein the distance threshold value is considered in a direction of travel.

4. The method of claim 1, wherein the surroundings map is produced during a journey of the transportation vehicle.

5. The method of claim 1, wherein the surroundings map is larger than a section of the surroundings map which is displayed on a display device.

6. An arrangement for producing a surroundings map of a transportation vehicle textured with image information, the arrangement comprising:
  a camera device for capturing at least first and second image information from vehicle surroundings; and
  a surroundings map production device to produce a surroundings map of the transportation vehicle and to select either the first or the second image information for at least one region of the surroundings map for texturing the surroundings map according to at least one of the following criteria:
  selecting the image information with higher resolution; and
  selecting more up-to-date image information, wherein the more up-to-date image information is used in response to detection that the transportation vehicle has travelled within a distance range relative to an object shown within the region of the surroundings map that is less than a predefined distance threshold value.

7. A transportation vehicle comprising the arrangement of claim 6.

8. The arrangement of claim 6, wherein the more up-to-date image information is used in response to a change in the vehicle surroundings and/or a predetermined object in the vehicle surroundings being detected within the region.

9. The arrangement of claim 6, wherein the distance threshold value is considered in a direction of travel.

10. The arrangement of claim 6, wherein the surroundings map is produced during a journey of the transportation vehicle.

11. The arrangement of claim 6, wherein the surroundings map is larger than a section of the surroundings map which is displayed on a display device.

* * * * *